3,644,438
6-HYDROXYMETHYL-15β,16β-METHYLENE PREGNENES AND PROCESS
Andor Furst, Basel, Dieter Kagi, Allschwil, Marcel Muller, Frenkendorf, and Peter Muller, Arlesheim, Switzerland, assignors to Hoffmann-La Roche Inc., Nutley, N.J.
No Drawing. Filed Mar. 11, 1970, Ser. No. 18,737
Claims priority, application Switzerland, Apr. 23, 1969, 6,142/69
Int. Cl. C07c *169/32*
U.S. Cl. 260—397.4                6 Claims

ABSTRACT OF THE DISCLOSURE

Medicinally valuable 6-methyl-15β,16β-methylene pregnenes are obtained from novel correspondingly substituted 6-hydroxymethyl-15β,16β-methylene pregnenes by a two step procedure. The 6-hydroxymethyl-15β,16β-methylene pregnenes are obtained by treatment of a 6-unsubstituted-15β,16β-methylene pregnene with formaldehyde.

BRIEF DESCRIPTION OF THE INVENTION

The present invention relates to novel steroids of the formula

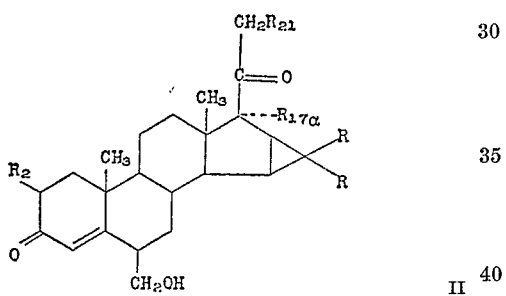

II where $R_2$ is hydrogen or halogen; $R_{17a}$ is hydroxy, acyloxy or alkoxy; $R_{21}$ is hydrogen, halogen, hydroxy, acyloxy or alkoxy and R both are either hydrogen or methyl.

The above compound of Formula II are useful as intermediates in the preparation of medicinally valuable steroids of the following formula

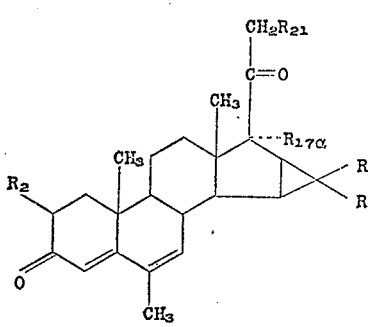

I where $R_2$, $R_{17a}$, $R_{21}$ and R are as above.

The compound of Formula I above exhibit hormonal activity and are useful as medicaments. They are described in greater detail in co-pending application Ser. No. 817,178, filed April 17, 1969, title "15,16-Substituted Steroids and Derivatives," inventors, Andor Fürst et al.

As used herein, the term "acyloxy" is meant to include a group containing the residue of a saturated or unsaturated aliphatic, cyclo-aliphatic, araliphatic or aromatic carboxylic acids having up to 20 carbon atoms, preferably up to 12 carbon atoms. Examples of such acids include formic acid, acetic acid, pivalic acid, propionic acid, butyric acid, caproic acid, enanthic acid, oleic acid, palmitic acid, stearic acid, succinic acid, malonic acid, citric acid and benzoic acid.

The term "alkoxy" is meant to include groups having up to 10 carbon atoms which can be of aliphatic, cyclo-aliphatic or araliphatic nature. Examples of suitable alkoxy groups for the practice of this invention include the methoxy, ethoxy, propoxy, butoxy and isomers such as tertiary butoxy, cyclopentyloxy, cyclohexyloxy and benzyloxy groups, among others.

The term "halogen" is meant to include fluorine, chlorine, bromine and iodine with fluorine, chlorine and bromine being the halogens of preference.

A preferred subgenus of the compounds of Formula II is obtained when R both are hydrogen. Preferred compounds within that subgenus are obtained when $R_2$ and $R_{21}$ are hydrogen and $R_{17a}$ is acetoxy. Compounds of Formula II of the present invention can be readily prepared by reacting a steroid of the formula

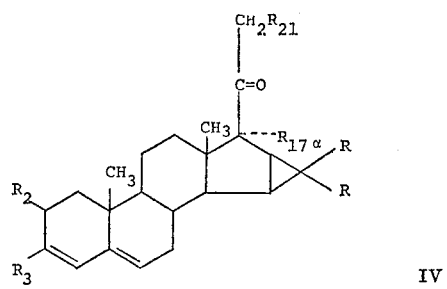

IV where $R_2$, $R_{17a}$, $R_{21}$ and R are as above and $R_3$ represents a residue of a secondary amine linked via the nitrogen atom with formaldehyde.

The reaction of a steroid of Formula IV with formaldehyde can be conveniently conducted by treating such steroidal starting material dissolved in a suitable solvent such as, for example, an aromatic hydrocarbon, e.g., benzene or toluene; an ether such as dioxane or tetrahydrofuran; or a lower aliphatic alcohol such as methanol or ethanol, with aqueous formaldehyde solution.

Steroids of Formula IV, where not otherwise available, may be readily prepared from a corresponding 3-keto-Δ⁴-steroid in a manner known per se by reacting the latter with a secondary amine, for example, with a di-(lower aliphatic)amine such as dimethylamine or diethylamine or, especially a 5- or 6-membered cyclic amine which can contain a further hereto atom, such as pyrrolidine, piperidine and morpholine.

The conversion of compounds of Formula II to compounds of Formula I can be readily accomplished by means of a two step procedure. In the first step compounds of Formula II are dehydrated to yield a steroid of the formula

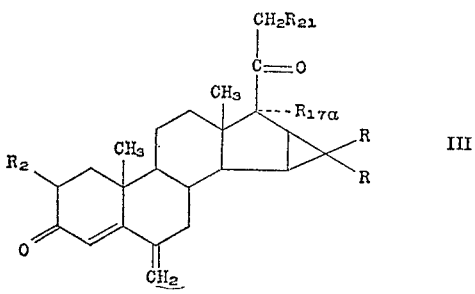

where $R_2$, $R_{17a}$, $R_{21}$ and R are as above.

The aforesaid dehydration can be carried out utilizing acid treatment. Suitable acids for this purpose include mineral acids, such as hydrochloric acid or strong organic acids, such as, for example, the sulfonic acids, e.g., p-toluenesulfonic acid. The dehydration procedure can be carried out in a suitable solvent such as, for example, aromatic hydrocarbons such as benzene or toluene, ethers such as dioxan or tetrahydrofuran or lower aliphatic alcohols such as methanol or ethanol.

The conversion of compounds of Formula III to compounds of Formula I involves an isomerization procedure involving the 6-methylene group in the compounds of Formula III. This isomerization utilizes a catalyst, such as a hydrogenation catalyst, most preferably palladium. The hydrogen donor such as cyclohexene may be added to the reaction mixture to serve as an activator for the catalyst. Undesired side-reactions such as hydrogenations by the hydrogen donor can be avoided by buffering the reaction mixture.

The present invention is further illustrated by the following example.

EXAMPLE 1

A mixture of 1.0 g. of 17α-acetoxy-15β,16β-methylene-pregn-4-ene-3,20-dione, 0.5 ml. of pyrrolidine, 30 mg. of p-toluenesulfonic acid and 15 ml. of benzene was heated to reflux for 5 hours using a water-separator. The mixture was cooled to room temperature, 15 ml. of ether was added and the mixture was allowed to stand for 15 minutes. The mixture was filtered and the filtrate evaporated in vacuo. A total of 1.2 g. of crystalline 17α-acetoxy-15β,16β-methylene - 3 - pyrrolidino-pregna - 3,5 - dien-20-one were obtained, $\epsilon_{279}=14,000$. This material was dissolved in 40 ml. of benzene and 80 ml. of absolute alcohol. With stirring, 1.6 ml. of 40 percent aqueous formaldehyde solution was added dropwise to the solution at room temperature over 5 minutes. The mixture was subsequently stirred for a further 30 minutes and then evaporated in vacuo. Chromatography of the residue on 60 g. of silica gel with benzene-acetone 5:1 yielded pure 17α-acetoxy-6β-hydroxymethyl-15β,16β-methylene-pregn - 4 - ene-3,20-dione, M.P. 234–236° C. (from acetone-hexane), $\epsilon_{242}=16,500$; $[\alpha]_D^{25}=-51°$ (c.=0.1 in dioxane).

EXAMPLE 2

A total of 0.65 ml. of water and 0.65 ml. of concentrated hydrochloric acid were added to a solution of 414 mg. of 17α-acetoxy - 6β - hydroxymethyl - 15β,16β-methylene-pregn-4-ene-3,20-dione in 35 ml. of dioxan. The mixture was held at room temperature for two and one-half hours. A total of 2.0 g. of sodium bicarbonate were added and the mixture was stirred for 15 minutes and filtered. The filtrate was evaporated in vacuum and the residue recrystallized from acetone-hexane. The pure 17α-acetoxy-6,15β,16β-bismethylene-pregn - 4 - ene-3,20-dione melted at 199–201° C. $\epsilon_{260}=12,100$ $[\alpha]_D^{25}=+100°$ (c.=0.1 in dioxane).

A total of 10 ml. of ethanol containing 0.5 percent cyclohexene was added dropwise over a period of five hours with stirring and heating to reflux to a mixture of 0.5 g. of 17α-acetoxy - 6,15β,16β-bis-methylenepregn-4-ene-3,20-dione, 250 mg. of sodium acetate, 25 mg. of 5 percent palladium on charcoal and 15 ml. of ethanol. The reaction mixture was filtered and the filtrate evaporated to dryness. The crude product was chromatographed on 75 g. of silica gel. Elution with hexane-ether yielded pure 17α-acetoxy - 6 - methyl - 15β,16β - methylene-pregna-4,6-diene-3,20-dione melting at 191–192° C. after recrystallization from acetone-hexane. $\epsilon_{289}=23,500$; $[\alpha]_D^{25}=-78°$ (c.=0.1 in dioxane).

We claim:
1. The compounds of the formula:

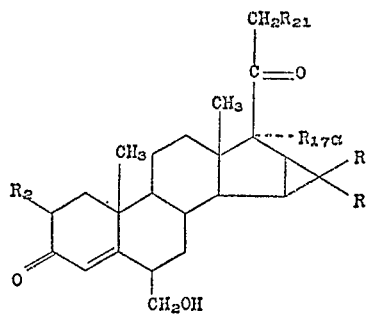

where $R_2$ is hydrogen or halogen; $R_{17a}$ is hydroxy, $C_{1-20}$ acyloxy or $C_{1-10}$ alkoxy; $R_{21}$ is hydrogen, halogen, hydroxy, $C_{1-20}$ acyloxy or $C_{1-10}$ alkoxy and R both are either hydrogen or methyl.

2. The compounds of claim 1 wherein R both are hydrogen.

3. The compounds of claim 2 wherein $R_2$ and $R_{21}$ both are hydrogen.

4. The compound of claim 3 which is 17α-acetoxy-6β-hydroxymethyl-15β,16β-methylene-pregn-4-ene-3,20-dione.

5. A process for the preparation of a compound of the formula

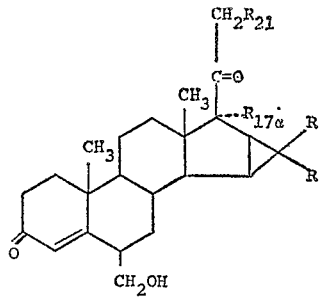

where $R_2$ is hydrogen or halogen; $R_{17a}$ is hydroxy, $C_{1-20}$ acyloxy or $C_{1-10}$ alkoxy; $R_{21}$ is hydrogen, halogen, hydroxy, $C_{1-20}$ acyloxy or $C_{1-10}$ alkoxy and R both are either hydrogen or methyl which process comprises reacting a compound of the formula

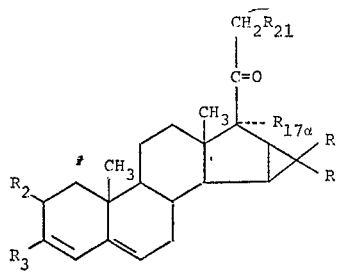

where $R_3$ is a residue of a secondary amine linked via the nitrogen atom; and $R_1$, $R_2$, $R_{17a}$ and $R_{21}$ are as shown above with formaldehyde.

6. The process of claim 5 wherein R, $R_2$ and $R_{21}$ are hydrogen; $R_{17a}$ is acetoxy and $R_3$ is pyrrolidino.

References Cited

UNITED STATES PATENTS 3,328,433   6/1967   Cooley et al. _____ 260—397.4
3,389,154   6/1968   Barn et al. _____ 260—397.45

HENRY A. FRENCH, Primary Examiner

U.S. Cl. X.R.

260—397.47, 999